L. M. JONES.
PITMAN CONNECTION.
APPLICATION FILED JAN. 24, 1910.
985,906.
Patented Mar. 7, 1911.
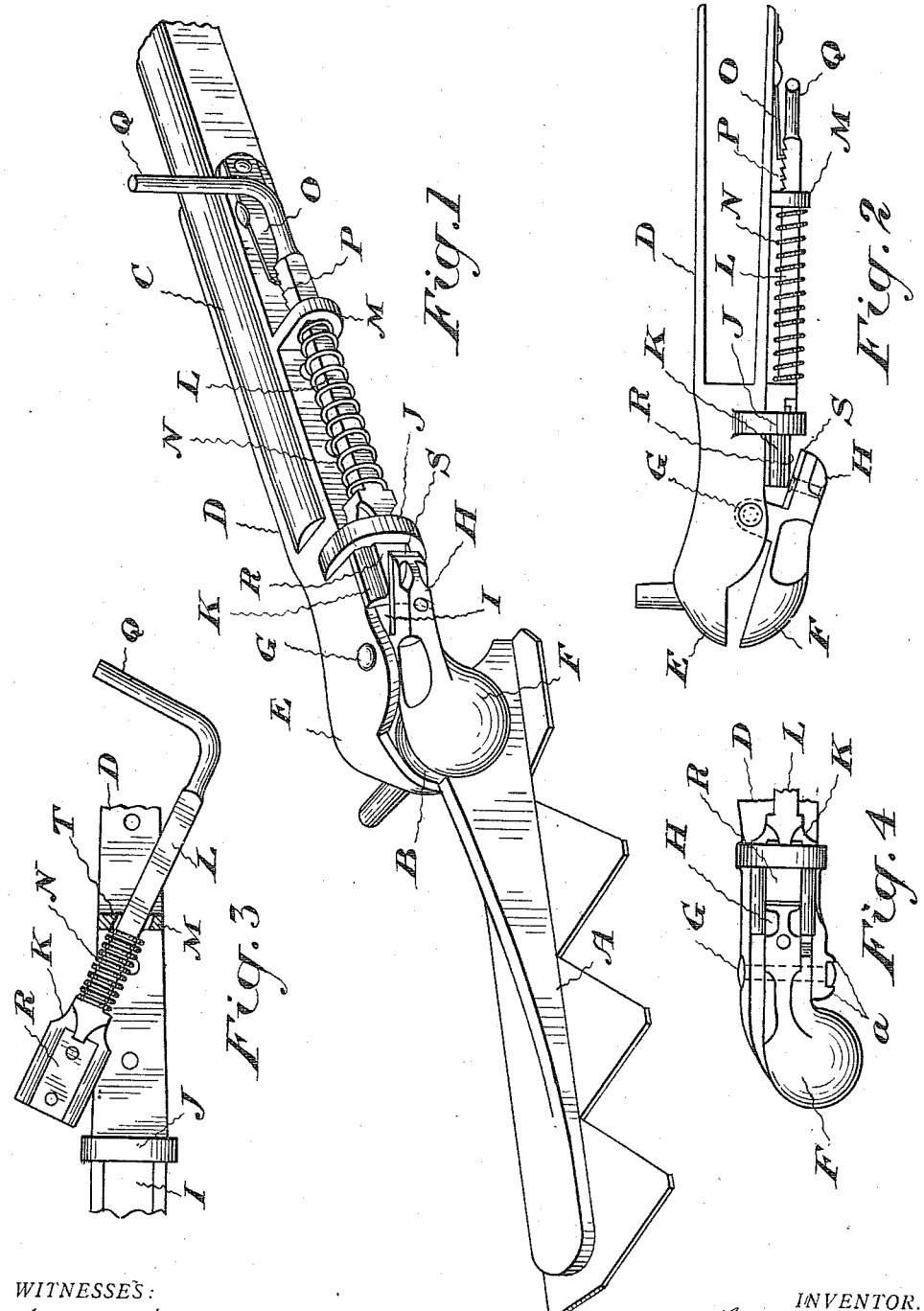
WITNESSES:
W. J. McMillan
E. Hall.
INVENTOR.
L. M. Jones
BY Ridout & Maybee
ATTORNEYS

UNITED STATES PATENT OFFICE.

LYMAN MELVIN JONES, OF TORONTO, ONTARIO, CANADA, ASSIGNOR TO THE MASSEY-HARRIS COMPANY, LIMITED, OF TORONTO, CANADA.

PITMAN CONNECTION.

985,906.      Specification of Letters Patent.      Patented Mar. 7, 1911.

Application filed January 24, 1910. Serial No. 539,845.

*To all whom it may concern:*

Be it known that I, LYMAN MELVIN JONES, of the city of Toronto, in the Province of Ontario, Canada, have invented certain new and useful Improvements in Pitman Connections, of which the following is a specification.

This invention relates to the ball and socket connection between the reciprocating knives of mowers and the like and the pitman conveying movement thereto. In such connections, adjustment must be provided to take up wear and also means for rapidly disconnecting the socket from the ball.

My object is to devise a construction by which adjustment for wear will be automatically effected, which will be durable, easily connected and disconnected, and easily assembled or taken apart.

I attain my object by forming one half of the ball socket rigid with the end of the pitman and hinging the other thereon. The hinged half of the socket is provided with a tail, behind which the end of a sliding bolt may lie to hold the half socket in position to engage the ball. The bolt is longitudinally movable in suitable guides on the pitman and is pressed forward by a suitable coil spring to automatically take up wear. A pawl and ratchet construction is employed to prevent backward movement.

The details of the construction, many of which are part of my invention, will be best understood on reference to the accompanying drawings, in which—

Figure 1, is a perspective view showing a portion of a knife and a pitman provided with my improved connection. Fig. 2 is a plan view of the end of the pitman. Fig. 3, is a face view, partly in section, of a portion of the end of the pitman. Fig. 4, is a face view, partly in section showing the method of pivoting the movable part of the socket.

In the drawings, like letters of reference indicate corresponding parts in the different figures.

A, is the heel of a knife, to which is connected in the ordinary manner a ball B.

C, is the pitman, the end of which is provided with the usual socket end piece D. On this end piece is formed the fixed half E, of the socket for the ball B. The movable half F of the socket is hinged upon the end D, by means of the pin G. This pin, it will be noted, has its head flattened at opposite sides, so that it will fit between the ribs *a* (see Fig. 4). Owing to this arrangement, the pin does not turn, consequently the movable half F, of the socket must turn on the pin which has ample bearing surface thereon, otherwise the pin would tend to turn in the part E, where the bearing surfaces are small. By my arrangement, wear is minimized.

On the movable half F, is formed the tail H, which is so shaped that an opening is formed between it and the side of the end piece D. Behind this tail is formed a recess I, in the end piece E, which recess the tail enters. The movable half F, of the socket is swung outwardly to allow the socket to be disengaged from the ball.

On the side of the end piece is formed a guiding lug J, through which is slidable a bolt K. The forward end of this bolt is preferably slightly beveled and is adapted to pass between the side of the end piece D, and the tail H, of the movable half of the socket.

Extending rearwardly from the bolt K, is a stem L, which is slidable in the guiding lug M, formed on the socket end piece E. A coil spring N, is placed on the stem L, and bears against the bolt K, and the lug M. This spring tends to yieldably press the bolt forward to engage the tail H, to hold the movable half F, of the socket in engagement with the ball, as shown. The tension of the spring will be such that the socket will be held in close engagement with the ball without undue pressure.

In order to hold the movable half F, in engagement with the ball, I provide a pawl and ratchet device, as shown. This preferably consists of a spring pawl O, adapted to engage a series of notches P, formed on the stem L. The end of the stem is preferably bent to a form of handle Q, whereby it may be operated. It will be noted particularly, on reference to Fig. 3, that the sides of the opening T, in the lug M, are beveled so that when the bolt and stem are withdrawn, as shown, they may be swung to one side and then slipped out of place through the hole T. This makes a convenient arrangement for assembling the parts.

As there is considerable wear on the faces of the bolt K, and the movable part F, of the socket, I secure to these parts where they contact the hard steel plates R, and S, and thus secure the desired freedom from wear and consequent durability.

It will be found that the connection as described is very convenient and effective in operation. The movable half of the socket will always be automatically adjusted as the parts were without requiring any attention on the part of the operator of the machine. I thus avoid all the trouble which has heretofore been experienced with adjusting devices which require personal attention.

What I claim as my invention is:

1. A pitman having one half of a bearing fixedly carried thereon; a complementary half bearing hinged thereon, a tail on said movable half bearing, a bolt with a beveled end longitudinally movable on the pitman to press its beveled end between the said tail and the pitman; yielding means tending to press forward the said bolt; and pawl and ratchet means to prevent a reverse movement of said bolt.

2. A pitman having one half of a bearing fixedly carried thereon; a complementary half bearing hinged thereon; a tail on said movable half bearing; slidable wedging means adapted to engage said tail to move said movable half bearing toward the fixed half bearing; yielding means adapted to move said wedging means to engage the said tail; and pawl and ratchet means to prevent a reverse movement of said operating means.

3. A pitman having one half of a bearing fixedly carried thereon; a complementary half bearing hinged thereon; a tail on said movable half bearing; a bolt with a beveled end longitudinally movable on the pitman to press its beveled end between the said tail and the pitman; means for holding the bolt with its forward end in engagement with the said tail; and pawl and ratchet means to prevent a reverse movement of said bolt.

4. A pitman having one half of a bearing fixedly carried thereon; a complementary half bearing hinged thereon; a tail on said movable half bearing; a bolt with a beveled end adapted to engage the tail; a guiding lug on the pitman through which the said bolt is slidable; a stem on the bolt; a lug on the pitman through which the said stem is slidable; a coil spring on the stem between the said lug and the bolt; and pawl and ratchet means to prevent a reverse movement of said bolt.

5. A pitman having one half of a bearing fixedly carried thereon; a complementary half bearing hinged thereon; a tail on said movable half bearing; a bolt with a beveled end adapted to engage the tail; a guiding lug on the pitman through which the said bolt is slidable; a stem on the bolt; a lug on the pitman through which the said stem is slidable; a coil spring on the stem between the said lug and the bolt; and a spring pawl secured to the pitman, the stem of the bolt outside the lug being provided with ratchet teeth for engagement by the pawl.

6. A pitman having one half of a bearing fixedly carried thereon; a complementary half bearing hinged thereon; a tail on said movable half bearing; a bolt with a beveled end adapted to engage the tail; a guiding lug on the pitman through which the said bolt is slidable; a stem on the bolt; a lug on the pitman through which the said stem is slidable, the hole in the lug having beveled sides to permit of the stem being swung to one side after the bolt has been withdrawn from its lug; a coil-spring on the stem between the said lug and the bolt; and pawl and ratchet means to prevent a reverse movement of said bolt.

Dated at Toronto this third day of January 1910.

LYMAN MELVIN JONES.

Signed in the presence of—
LOUIS ANDREW MCTAGGART,
CHARLES JAMES COCKER.

---

Copies of this patent may be obtained for five cents each, by addressing the "Commissioner of Patents, Washington, D. C."